UNITED STATES PATENT OFFICE.

GEORG CARL JULIUS SCHNEIDER, OF ERIE, PENNSYLVANIA.

IMPROVEMENT IN SAFETY-MATCH COMPOSITIONS.

Specification forming part of Letters Patent No. 157,873, dated December 15, 1874; application filed August 18, 1874.

*To all whom it may concern:*

Be it known that I, GEORG C. J. SCHNEIDER, of the city and county of Erie and State of Pennsylvania, have invented an Improved Composition for Safety-Match, of which the following is a full, clear, and exact description:

The object of my improvement is to provide a safety parlor-match—one which it is impossible to ignite without bringing the same in frictional contact with a rubber consisting of a composition especially provided for this purpose.

I am well aware that I am not the first to invent a safety-match, as such a match for the past quarter of a century has been well known in Europe, and is described in the Encyclopedia Britannica published in 1857, and is commonly known as the Swedish match.

The advantages of my improvement is found, first, in its simplicity, and, second, in the fact that I accomplish the results aimed to be attained by the use of fewer and cheaper ingredients, and by the omission of any ingredients which would permit the match to be ignited except through direct frictional contact with a rubber, such as before referred to.

To more clearly illustrate my improvement or the nature of my invention, as well as its advantage over the Swedish match, I would state that the compound used consists simply of starch, water, brick-dust, chlorate of potassa, golden sulphuret of antimony, and flowers of sulphur, while the Swedish match consists of the following ingredients, viz., glue, starch, gum arabic, chlorate of potassa, chromate of potassa, powdered glass, sulphuret of black antimony, oxide of iron, sulphur-flowers, and water. Now, in this Swedish compound the chromate of potassa and sulphuret of antimony, combining with the chlorate of potassa, cause the Swedish match easily to ignite by friction on a smooth surface, a little heat being sufficient to cause its ignition. With my composition, there being no such combination of ingredients, all danger of such accidental and undesirable ignition is prevented; and the objection herein stated applies with equal force to J. W. Hjerpe's patent, No. 40,259, dated October 13, 1863, and which is literally the Swedish match hereinbefore referred to.

The construction and operation of my invention are as follows: I take five (5) parts of starch, forty-two (42) parts of water, sixteen (16) parts of brick-dust, thirty-two (32) parts of chlorate of potassa, three (3) parts of golden sulphuret of antimony, and two (2) parts of flowers of sulphur. These I thoroughly combine so as to form a composition. The wooden portion of the matches having been prepared, the composition is applied by any suitable means.

While practical experience has demonstrated that the foregoing formula and proportions are admirably adapted for the purpose designed, still I desire it understood that I do not limit myself to the exact proportions stated, as these may be varied without in the slightest degree affecting the object of my invention.

The rubber which I propose to use consists of a composition of starch, amorphous phosphorus, water, and sulphuret of black antimony. This composition forms no part of my present invention, as it is to be the distinctive subject-matter of an independent application.

What I claim as new, and desire to secure by Letters Patent of the United States, is—

A composition for safety parlor-matches, consisting of brick-dust, chlorate of potassa, golden sulphuret of antimony, flowers of sulphur, starch, and water, as hereinbefore described.

In testimony whereof I have signed my name to this specification in the presence of two subscribing witnesses.

GEORG CARL JULIUS SCHNEIDER

Witnesses:
JOHN DODGE, Jr.,
EDWARD GAYLORD